(12) United States Patent
Flaherty

(10) Patent No.: US 8,322,582 B2
(45) Date of Patent: Dec. 4, 2012

(54) OVER CAB EXTENSION KIT

(75) Inventor: Joseph Flaherty, Prospect, CT (US)

(73) Assignee: Thule Sweden AB (SE)

( * ) Notice: Subject to any disclaimer, the term of this patent is extended or adjusted under 35 U.S.C. 154(b) by 1014 days.

(21) Appl. No.: 12/252,428

(22) Filed: Oct. 16, 2008

(65) Prior Publication Data

US 2009/0166390 A1 Jul. 2, 2009

Related U.S. Application Data

(60) Provisional application No. 60/983,053, filed on Oct. 26, 2007.

(51) Int. Cl.
*B60R 9/04* (2006.01)
(52) U.S. Cl. .............................. 224/405; 224/403; 296/3
(58) Field of Classification Search .......... 224/403–405, 224/314, 319–322; 296/3
See application file for complete search history.

(56) References Cited

U.S. PATENT DOCUMENTS

| | | | | |
|---|---|---|---|---|
| 5,152,570 A | * | 10/1992 | Hood | 296/3 |
| 5,725,137 A | * | 3/1998 | Macdonald | 224/405 |
| 5,743,702 A | * | 4/1998 | Gunderson | 414/542 |
| 5,806,905 A | * | 9/1998 | Moore | 296/3 |
| 5,927,782 A | * | 7/1999 | Olms | 296/3 |
| 6,347,731 B1 | * | 2/2002 | Burger | 224/405 |
| 6,786,522 B2 | * | 9/2004 | Kench et al. | 296/3 |
| 7,641,251 B1 | * | 1/2010 | Stepanians | 296/3 |
| 2002/0163214 A1 | * | 11/2002 | Carter | 296/3 |

* cited by examiner

*Primary Examiner* — Gary Elkins
*Assistant Examiner* — Corey Skurdal
(74) *Attorney, Agent, or Firm* — Novak Druce & Quigg LLP

(57) ABSTRACT

A cargo carrier kit for a truck comprises a plurality of first rail sections for joining end to end to provide a first side rail. The cargo carrier also includes a plurality of second rail sections for joining end to end to provide a second side rail having a separation from the first side rail and a parallel relationship thereto. A forward load bar, supportable on the first side rail and the second side rail provides a connection over the cab of the truck, between the side rails. The cargo carrier kit also includes mounting blocks for releasable attachment of at least a first load bar and at least a second load bar to provide cross members connecting the side rails and positioning the first and second load bars respectively over the mid-section and rear of the truck bed.

6 Claims, 5 Drawing Sheets

OVER CAB EXTENSION KIT

CROSS-REFERENCE TO RELATED APPLICATIONS

This application claims priority to U.S. Provisional Application 60/983,053, filed Oct. 26, 2007 which is hereby incorporated by reference.

TECHNICAL FIELD

The present invention relates to a demountable cargo carrier as needed to support cargo transportable on a vehicle such as a pickup truck. More specifically, the present invention relates to a cargo carrier assembled for mounting over the bed of the pickup truck with an elevated, cantilievered extension of the cargo carrier located over the cab of the pickup truck.

BACKGROUND

Pickup trucks are popular vehicles providing convenient transportation combined with greater cargo carrying capacity than typical forms of personal transportation, including automobiles and sports utility vehicles and the like. Design criteria for pickup trucks consider expected frequency of cargo transportation and include cargo box or truck bed space to satisfy common requirements. On occasion, oversize items such as ladders, planks and boards may overlap the length or width of the truck bed or of the truck itself. Without suitable adaptation, oversize items may be loaded precariously so that they project over the sides and rear of the vehicle. Having exceeded the capacity of the truck bed, oversize objects become unsafe obstructions. A solution to safety problems is to increase the amount of cargo space using an elevated support frame or cargo carrier secured either to the bed of the pickup truck or to the sidewalls of the cargo box, for example.

Known elevated cargo carriers for pickup trucks have various disadvantages. One example of a known elevated cargo carrier is probably better factory installed due to its bulk and design complexity. A bulky cargo carrier includes parts of significant size that could require special delivery. In some cases, parts are commonly custom manufactured for a specific make and model of pickup truck. Custom manufactured cargo carriers sold after manufacture of the truck present problems related to their delivery and assembly by the user.

Another type of known elevated cargo carrier has a complex structure that allows the carrier to be folded for storage in the bed of the pickup truck, against the rear wall of the vehicle cab, for example. In this case the parts used for assembly of the elevated cargo carrier include custom bars and custom hinges that both support and facilitate folding of the carrier frame. The folding cargo carrier may be useful to provide additional cargo carrying area when required but this benefit is offset by the need to essentially re-assemble the cargo carrier each time it is unfolded to provide elevated cargo space to accommodate large or extended items.

In contrast to bulky elevated cargo carriers and those of complex structures including folding capability, there are relatively simple structures that are easy to install to provide a support structure above the bed of a pickup truck. An example of an easily installed cargo carrier uses supports attached to the bed of the truck or walls of the cargo box to raise a pair of crossbars to a height above the roofline of the pickup truck. The crossbars are deployed with one at the forward end of the truck bed and the other towards the tailgate. Use of this type of cargo carrier is limited to support for elongate objects such as ladders having a length that exceeds that of the pickup truck bed. The two-point support of the crossbars allows ladders and the like to be slid into a balanced position extending over the pickup truck cab.

Simple structures of the type described above providing two-point support have limited functionality. Improved functionality results by constructing elevated cargo carriers to include a reinforcing rail structure running in the lengthwise direction of vehicle. An example of this type of cargo carrier has a rail attached to opposing ends of a number of cross bars to rise upwards from the crossbar. This type of construction creates a lengthwise erect barrier, at the side of the vehicle, which users must reach over when removing items supported on the crossbars. Restricted access to cargo is both inconvenient and could lead to situations in which users may employ unsafe methods to raise large and unwieldy objects above the height of the elevated cargo carrier.

FIG. 1 exemplifies a prior art ladder rack assembly disclosed by Levi in U.S. Pat. No. 6,971,563. The ladder rack assembly comprises first 10 and second 12 tubular bars designed to extend across the width dimension of the vehicle, e.g. a pickup truck, above its roof line. The tubular bars provide two-point 10, 12 support for elongate objects such as ladders or planks and the like having a length greater than the length of the pickup truck bed. During transportation, unsupported ends of elongate objects could hang precariously above the roof and behind the tailgate of the vehicle. The rack of Levi is exemplary of the structure referred to previously as a standard elevated rack.

FIG. 2 shows a prior art truck rack assembly 1 disclosed by Moore in U.S. Pat. No. 5,806,905. The truck rack 1 includes additional cross members 22, providing more points of support for elongate objects. As illustrated, the truck rack 1 of Moore includes a forward extension including cross members generally identified by numeral 23 having at either end two side frames 18 providing support and counterbalancing the cantilevered forward extension.

By providing additional support in the form of more cross bars and the forward extension, the truck rack of Moore represents a less precarious mode of transporting elongate objects than that of Levi. However, the side frames tend to limit loading of objects to rear vehicle access. Loading the rack from the rear may be satisfactory for oversize elongate objects such as ladders and boards, but restricted access from the side of the vehicle limits use of the truck rack for attachment of a variety of accessories to the cross bars of the rack.

In view of the above described deficiencies associated with the use of known designs for elevated cargo carriers, the present invention has been developed to alleviate these drawbacks and provide further benefits to the user. These enhancements and benefits are described in greater detail hereinbelow with respect to several alternative embodiments of the present invention.

DISCLOSURE OF THE INVENTION

The present invention in its several disclosed embodiments alleviates the drawbacks described above with respect to conventionally designed elevated cargo carriers and incorporates several additionally beneficial features.

One embodiment of the assembled cargo carrier is in the form of a rectangular frame with the addition of a forward extension positioned above the cab of the vehicle to provide more cargo carrying capacity. Attachment of the frame to the vehicle uses optional attachment means secured to the bed of the pickup truck for example, or to the walls forming the cargo box around the truck bed.

A cargo carrier including an over-cab extension in accordance with the present invention is the result of adding components of a compact cargo carrier kit to a standard elevated rack consisting of a pair of cross members each attached above the bed of the pickup truck by a pair of upright supports. The rack referred to here as a standard elevated rack is of a known type that benefits from the features of the cargo carrier kit in accordance with the present invention. Features of the kit include relatively short rail sections that provide extended rails when the sections are fixedly spliced together. Rail sections are short enough for packaging and transport to a purchaser using a parcel delivery service. The extended rails provide side rails of a length substantially equal to the length, front to back, of the pickup truck. Points at which rail sections are spliced together include splice plates that provide splices of such strength that the side rails exhibit essentially no sag along their length even under loads as heavy as 1200 pounds. Materials used to produce splice plates include strong structural materials including metals, preferably steel.

Another reason for side rails free from sag is the need for the side rails to counterbalance the weight of the cantilevered, over-cab extension that is positioned above the roof of the pickup truck cab without touching it. In addition to possessing the strength needed for an elevated cargo carrier having a cantilevered over-cab extension, the cargo carrier in accordance with the present invention has simple, clean lines with load bars as cross members deployed on top of the side rails to facilitate access to the load bars from the side of the vehicle. Side access represents an improvement over earlier cargo carriers and is important because load bars in accordance with the present invention include attachment features such as track-ways for insertion of retainers for accessories that are transportable on the cargo carrier.

An exemplary embodiment according to the present invention uses four upright posts or related support structures attached on the sidewalls adjacent to the four junctions of the walls of the cargo box. The posts extend upwards from the walls of the cargo box to a height that places the frame of the cargo carrier in a horizontal plane higher than the roof of the pickup truck after joining connecting blocks of the rectangular frame to the tops of the upright posts. The horizontal plane occupied by the rectangular frame of the cargo carrier ensures that the forward extension lies over the vehicle cab without touching it.

A pickup truck using a cargo carrier according to the present invention has carrying capacity for items that fit into the cargo box as well as for objects suitably carried on the rectangular frame and forward extension provided by optional embodiments according to the present invention.

A rail section in accordance with the present invention is an extruded rail formed from metal or suitable extrudable structural material. In cross section the rail section has a generally arcuate outer surface opposite a surface having a pair of recesses inward thereof. Each of the recesses adjoins opposing bolt-head receiving indentations. A space between the recesses and the arcuate outer surface provides an open-ended cavity that accommodates a splice plate used for joining rail sections together. The rail also includes a shaped depression opening to a sidewall of the rail section. Providing a track along a length of rail, the shaped depression provides a convenient point for connecting accessories including ladder lift assist mechanisms, ladder tilt mechanisms, conduit boxes and awnings that provide covered workspace at the side of the vehicle and the like.

For purposes of constructing a cargo carrier according to the present invention, the pair of recesses and adjoining indentations provide parallel channels formed along the length of the rail section. Opposing ends of each rail section present an open ended cavity to receive part of a splice plate that includes at least two, preferably four, threaded holes to align with corresponding apertures formed through the recess wall. After aligning the apertures and threaded holes, suitably sized threaded bolts, passing through the recesses and apertures, rotatably engage the threaded holes for fixed attachment of the splice plate to the end of the rail section. A portion of the splice plate extends from the end of the rail section for attachment to the end of another section of rail after aligning threaded holes and apertures and fixed attachment with bolts as described above.

It will be appreciated that the profile of the heads of the threaded bolts will be of such dimensions that they will be contained in the recess without impeding the space between the indentations that receive bolt heads used for connecting rail sections to lift blocks positioned for secure connection of side rails to load bars and posts clamped to the walls of the cargo box of the pickup truck.

More particularly, in accordance with the present invention a cargo carrier kit for a truck comprises a plurality of first rail sections for joining end to end using a number of first splice plates to provide a first side rail including a forward end portion and a trailing end portion. The cargo carrier also includes a plurality of second rail sections for joining end to end using a number of second splice plates to provide a second side rail having parallel alignment to the first side rail and having a separation therefrom; the second side rail including a front end portion and a rear end portion. A forward load bar, supportable on the first side rail and the second side rail provides an over-cab connection therebetween. The cargo carrier kit also includes at least a first block, for releasable mounting between the forward end portion and trailing end portion of the first side rail. At least a second block provides releasable mounting between the front end portion and the rear end portion of the second side rail. The first and second blocks provide points of connection for opposing end portions of at least a first load bar to provide at least a first connection of the first side rail to the second side rail. At least a third block provides releasable mounting at the trailing end portion of the first side rail and at least a fourth block provides releasable mounting at the rear end portion of the second side rail. The third and fourth blocks provide points of connection for opposing end portions of the at least a second load bar to provide at least a second connection of the first side rail to the second side rail.

An embodiment of a truck cargo carrier in accordance with the present invention comprises a first side rail including a forward end portion, a trailing end portion and a plurality of first rail sections joined end to end using a number of first splice plates. A second side rail parallel to the first side rail has a separation therefrom. The second side rail includes a front end portion, a rear end portion and a plurality of second rail sections joined end to end using a number of second splice plates. At least a first load bar is supported over the first side rail mid-way between the forward end portion and the trailing end portion and over the second side rail mid-way between the front end portion and the rear end portion to provide at least a first connection between the first side rail and the second side rail. At least a second load bar, spaced apart from the first load bar, is supported over the first side rail adjacent to the trailing end portion and over the second side rail adjacent to the rear end portion to provide at least a second connection between the first side rail and the second side rail. The cargo carrier also includes a forward load bar supported over the first side rail adjacent to the forward end portion, the forward load bar supported over the second side rail adjacent to the front end portion to provide an over-cab connection between the first side rail and the second side rail.

The beneficial effects described above apply generally to the exemplary devices and mechanisms disclosed herein of the compact cargo carrier kit. The specific structures through which these benefits are delivered will be described in detail hereinbelow.

BRIEF DESCRIPTION OF THE DRAWINGS

The invention will now be described in greater detail in the following way of example only and with reference to the attached drawings, in which.

MODE(S) FOR CARRYING OUT THE INVENTION

As required, detailed embodiments of the present invention are disclosed herein; however, it is to be understood that the disclosed embodiments are merely exemplary of the invention that may be embodied in various and alternative forms. The figures are not necessarily to scale and some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

Figure 1:
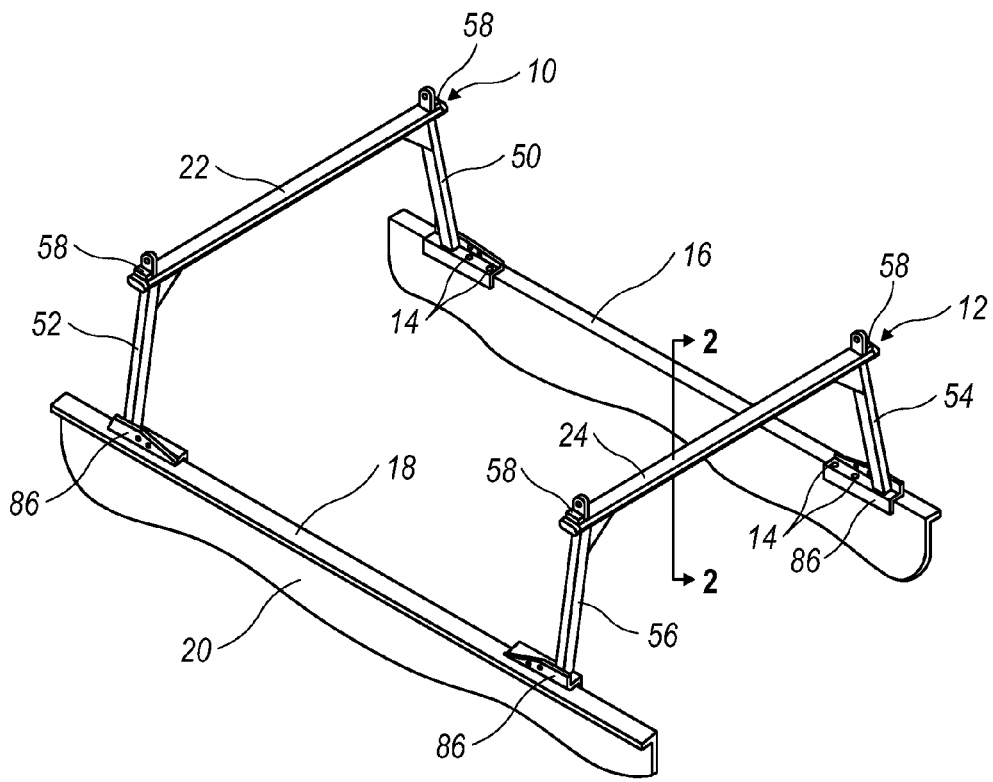
FIG. 1 is a partial perspective view of showing a prior art cargo carrier mounted over the cargo box of a pickup truck.
Figure 2:
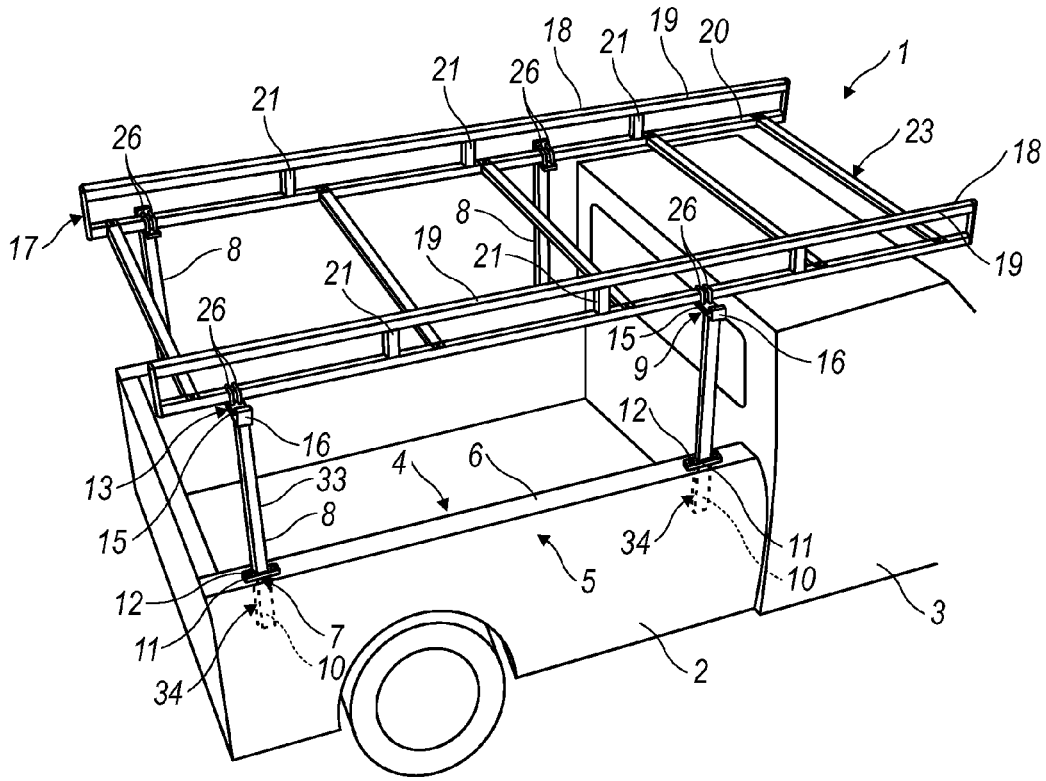
FIG. 2 provides a perspective view of of a pickup truck having a cargo carrier mounted thereon with reinforced side beams supporting a cantilevered forward portion extending over the roof of the pickup truck cab.
Figure 3:
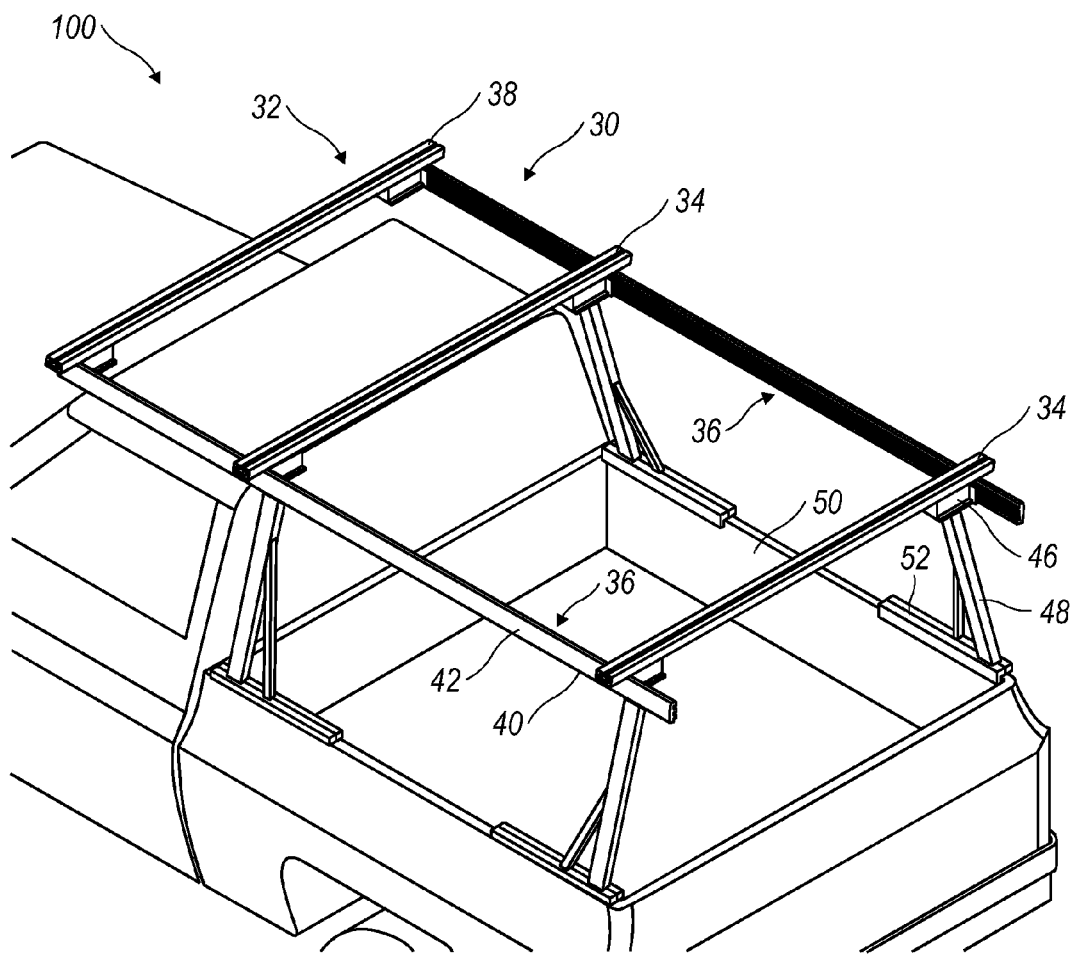
FIG. 3 is a perspective view illustrating a cargo carrier mounted on a pickup truck, the cargo carrier including an over-cab extension assembled using a kit according to the present invention.

FIG. 3 and subsequent drawings provide illustration of elements in accordance with the present invention using numerals that identify like parts throughout the several views. The drawing of FIG. 3 is a perspective view illustrating a cargo carrier 30 in accordance with the present invention mounted on a pickup truck 100. The cargo carrier 30 includes an over-cab extension 32 having similar positioning to the forward extension disclosed by Moore in U.S. Pat. No. 5,806,905 but without side frames. Elimination of side frames gives the added advantage of access to the cross bars, referred to herein as load bars 34, from the side of the vehicle to use the load bars 34 as supports for accessories such as ladder lift assist mechanisms, ladder tilt mechanisms, conduit boxes and awnings that provide covered workspace at the side of the vehicle and the like.

A cargo carrier including an over-cab extension 32 in accordance with the present invention uses a cargo carrier kit to provide strengthened side rails 36 to support the over-cab extension 32 and a third load bar 38. Further benefits provided by a cargo carrier kit in accordance with the present invention will be described with reference to FIG. 4.

Before discussing the fully assembled cargo carrier 30, the components included in the over-cab extension kit will be identified to show how they attach to a conventional cargo carrier that has two load bars 34 as cross members supported above the truck bed. A list of kit components includes a number of rail sections 40 joined to form two side rails 36 each including three or more sections 40 depending on the length of the vehicle. Each junction 42 between rail sections 40 uses a splice plate 44 inserted in the ends of the rail sections 40 on either side of a junction 42. A splice plate 44 includes several holes, preferably eight, suitably tapped to engage threaded bolts inserted through apertures provided at each end of a rail section 40. It will be appreciated that the end of each rail section 40 on either side of a junction 42 will accommodate half a splice plate 44 to provide a high strength connection using a requisite number of bolts, preferably four, for each end of the rail sections 40. High strength connections between rail sections 40 provide reinforcement for the side rails 36 that support the over-cab extension 32 and the third load bar 38 also included as a component of the cargo carrier kit. Other components of the cargo carrier kit include a number of lift blocks 46, preferably four, and sufficient bolts and associated connectors to complete assembly of a cargo carrier with over-cab extension 32 in accordance with the present invention that could be loaded with up to 1200 pounds of equipment, accessories and other kinds of cargo.

Figure 4:
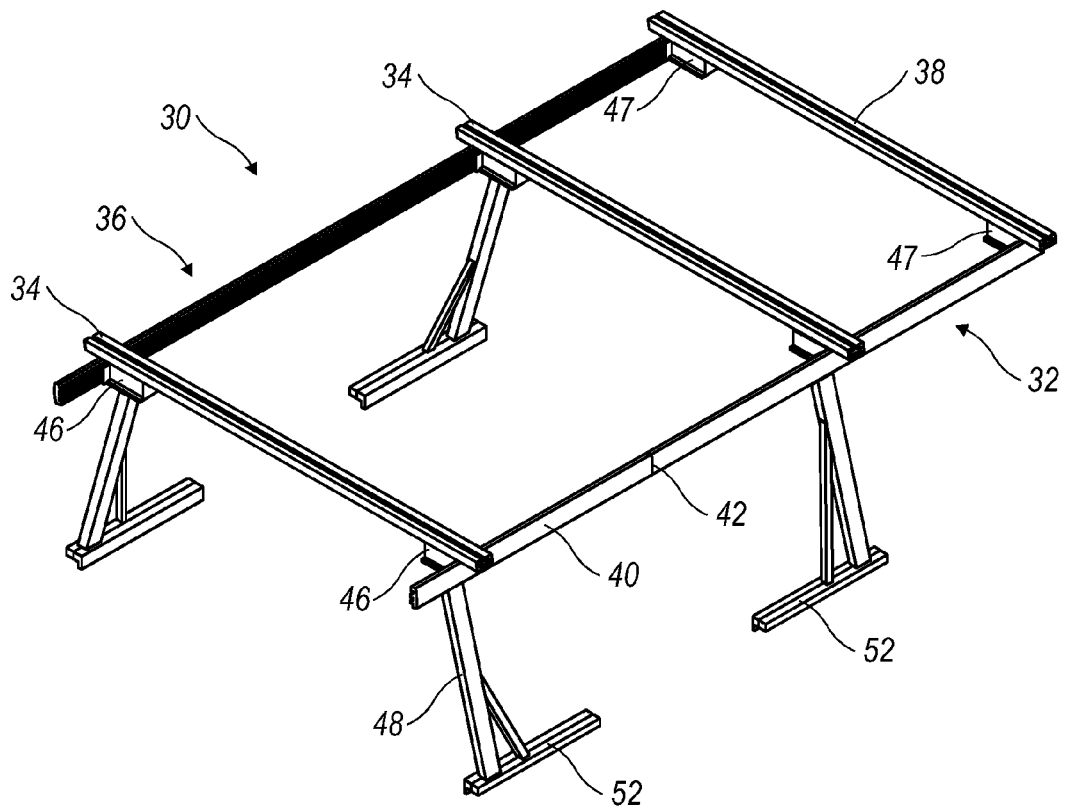
FIG. 4 is a perspective view of the structure of a cargo carrier including an over-cab extension according to the present invention.

FIG. 4 shows a cargo carrier 30 assembled by combining the cargo carrier kit in accordance with the present invention with components of a conventional cargo carrier including two load bars 34 connected to upright posts 48 attached to the walls 50 of the cargo box of the pickup truck 100 by clamps 52. A method of assembling the cargo carrier 30 first requires splicing of rail sections 40 to provide two side rails 36. In a preferred embodiment of the present invention the rail sections 40 have a length of about one third the length of the side rail 36. Construction of a side rail 36 requires the use of three rail sections 40 spliced together with two junction forming splice plates 44. The side rails 36 when attached to the upright posts 48 support the weight of the cantilevered over-cab extension 32. Since it is preferred that the side rails 36 remain rigid without sagging, it is necessary that the splice plates 44 comprise solid, rigid, high-strength material that produces high strength splices between rail sections 40. Using high strength materials for rail sections 40 and splice formation, the design of a cargo carrier 30 in accordance with the present invention produces a simple, aesthetically pleasing appearance combined with structural characteristics commensurate with the performance expected of a stable cantilevered over-cab extension 32.

Figure 8:
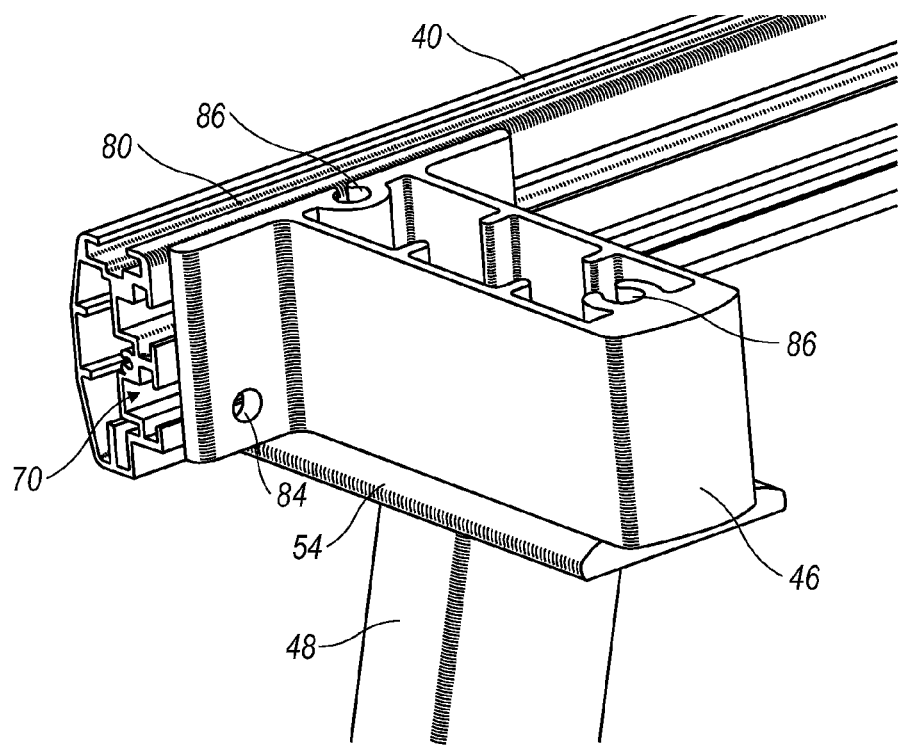
FIG. 8 provides a perspective view illustrating a lift block according to the present invention for interconnecting a side rail and a load bar to an upright post for connection of the cargo carrier to the pickup truck.

Following formation of the side rails 36, further assembly of the cargo carrier 30 proceeds with attachment of an equal number of lift blocks 46, preferably two, to each of the side rails 36 at points along the side rails 36 that will align with upright posts 48 on which the lift blocks 46 will be mounted. FIG. 8 provides detail of the connection between a side rail 36 and a lift block 46. Having attached lift blocks 46 to the side rails 36, it is necessary to remove load bars 34 from the upright posts 48 to allow positioning of lift blocks 46 on mounting plates 54 of the upright posts 48. With the base of each lift block 46 resting on a mounting plate 54, the load bars 34 are reconnected to the upright posts 48 this time positioned on top of the lift blocks 46. A bolted connection provides a suitable means for fixedly joining load bars 34 to upright posts 48 capturing lift blocks 46 between the load bars 34 and the mounting plates 54 to secure the side rails 36 to the cargo carrier 30 and to the truck 100. Completion of assembly of the cargo carrier 30 requires attachment to the sidebars 36 of the load bar 38 forming part of the over-cab extension 32 above the roofline of the truck 100. Attachment of the load bar 38 of the over-cab extension to the side rails 36, uses a common lift block 46 or an optional connecting block 47 bolted to the side rail 36 and having at least one vertical through hole to accommodate one or more connecting bolts used to join the load bar 38 to the connecting block 47. Opposing ends of load bars 34, 38 could substantially align with the longitudinal axis of the side rails 36 or include an overlap providing an elevated cargo carrier 30 of increased area.

Figure 5:
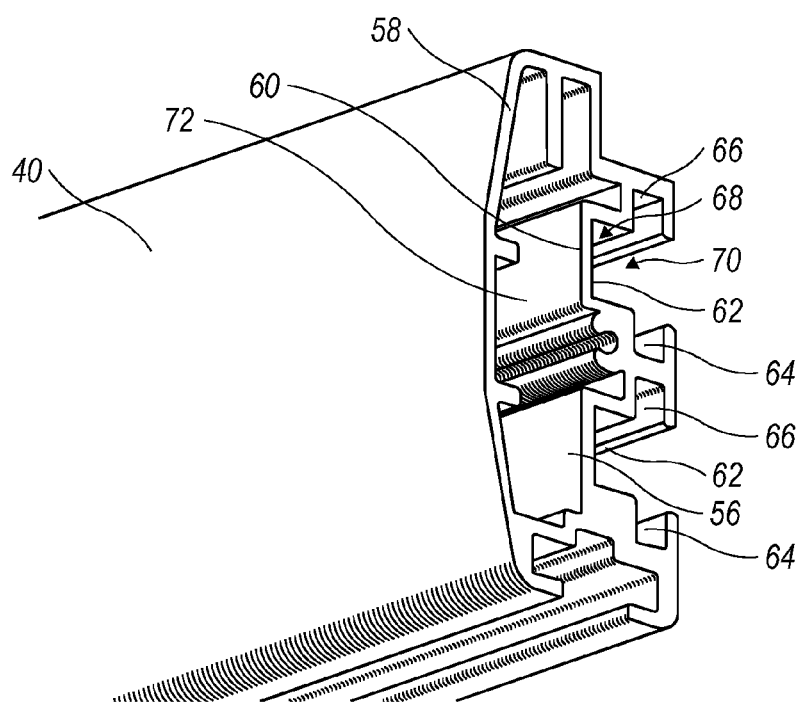
FIG. 5 shows a perspective view of an extruded rail section showing internal structure required for assembly and attachment of a side rail to upright posts used to connect the cargo carrier according to this invention to the transporting pickup truck.

FIG. 5 shows a perspective view of an extruded rail section 40 showing internal structure required for assembly and attachment of a side rail 36 to a lift block 46 included in the connecting structure attaching a load bar 34 to an upright post 48. The extruded rail 40 has a generally tubular structure including a cavity 56 sized to accommodate a splice plate 44 used to connect rail sections 40 to each other. Enclosing the cavity 56 on one side is a generally curved, arcuate wall 58 that has connection to a stepped wall 60 formed to include a recess 62 bounded by a first indentation 64 opposite a second indentation 66. The recess 62 and first and second indentations 64, 66, extend the length of the rail section 40 producing a pair of inner channels 68 and a pair of grooves 70. Positioning of the inner channels 68 facilitates the use of bolts passing through the channel wall 72 to engage splice plates 46 during splicing together of rail sections 40 as described previously. As evident from review of FIG. 6 and FIG. 7, the heads 74 of bolts used in splice formation are contained within the space available in the recess 62 so that they do not encroach on the space between the indentations 64, 66. It is necessary to keep the grooves 70 clear of impeding structures to allow attachment of lift blocks 46 that need free movement along the grooves 70 to allow the blocks 46 to move into alignment with the mounting plates 54 of upright posts 48. Since lift blocks 46 cover only a small portion of the grooves 70, it is conceivable to use the grooves 70 for engaging and slidably positioning accessory items that could be conveniently attached to the cargo carrier 30. The ability to slide, maneuver and otherwise locate equipment and accessories forward or rearward with respect to the orientation of the vehicle is a particular benefit of the cargo carrier 30 that allows versatile positioning over the cargo box or the over-cab extension 32.

Figure 6:
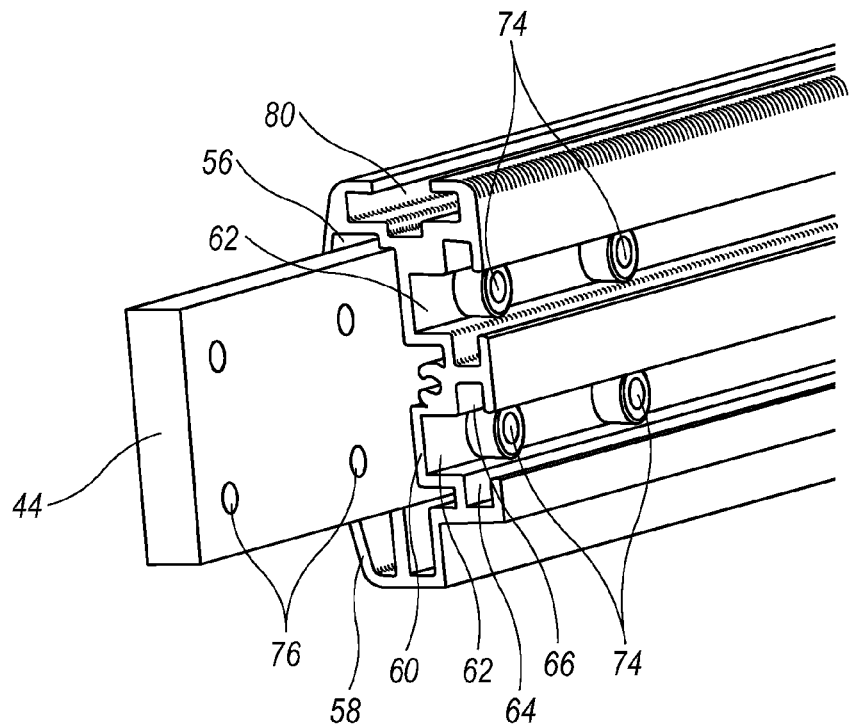
FIG. 6 provides a perspective view illustrating a splice plate according to the present invention for interconnecting rail sections for forming a side rail according to the present invention.

FIG. 6 provides a perspective view illustrating a splice plate 44 in accordance with the present invention for interconnecting rail sections 40 when forming a side rail 36. Splice formation involves inserting about half of the splice plate 44 into the cavity 56 then securing the portion of the splice plate 44 inside the end of the rail section 40 using bolts that engage threads in holes 76 machined in the splice plates 44. As discussed above, the heads 74 of bolts used in splice formation are contained within the space available in the recess 62 so that they do not encroach on the space between the indentations 64, 66. Dimensions of the splice forming components 40, 44, require close tolerance to minimize, preferably eliminate, splice deflection that leads to sagging of assembled side rails 36.

A track-way 80, shown in FIG. 6, runs the length of the side rail 36. The purpose of the track-way is for attachment of accessories anywhere along the top edge of the side rail 36.

Figure 7:
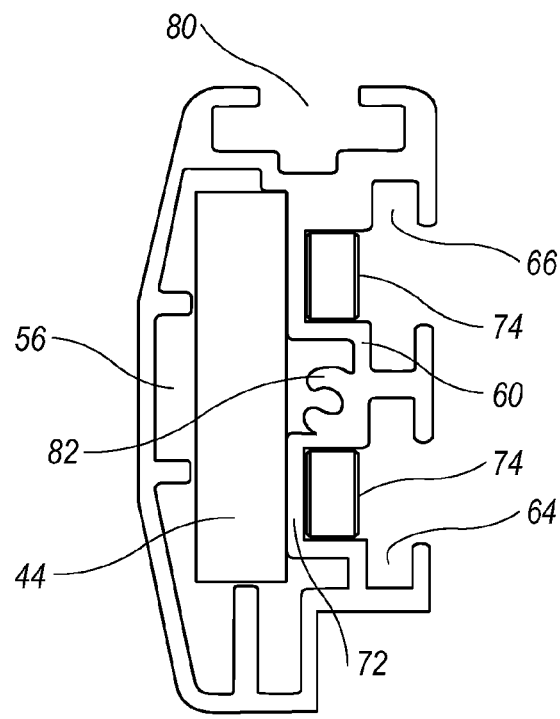
FIG. 7 provides a cross sectional view providing detail of a splice plate bolted to the end of a rail section used for forming a side rail according to the present.

FIG. 7 provides a cross sectional view providing detail of a splice plate bolted to the end of a rail section 40 used for forming a side rail 36. As illustrated, FIG. 7 clearly shows the positioning of the splice plate 44 and bolt heads 74 after securing the splice plate 44 to the end of the rail section 40.

In addition to identifying the accessory track-way 80, FIG. 7 includes an end cap connector 82 suitably placed for attaching an end closure (not shown) for a side rail 36.

FIG. 8 provides a perspective view illustrating a lift block 46 according to the present invention resting on a mounting plate 54 for interconnecting a side rail 36 and a load bar 34 to an upright post 48 for connection of the cargo carrier 30 to the pickup truck 100. In addition, FIG. 8 shows a mounting hole 84 used to connect a lift block 46 to a side rail 36. The mounting hole 84 receives the shaft of a bolt held by a bolt head previously slid into the groove 70 formed between the indentations 64, 66. Through-hole mounts 86 act as guides for the bolts used to secure load bars 34 to upright posts 48.

Figure 9:
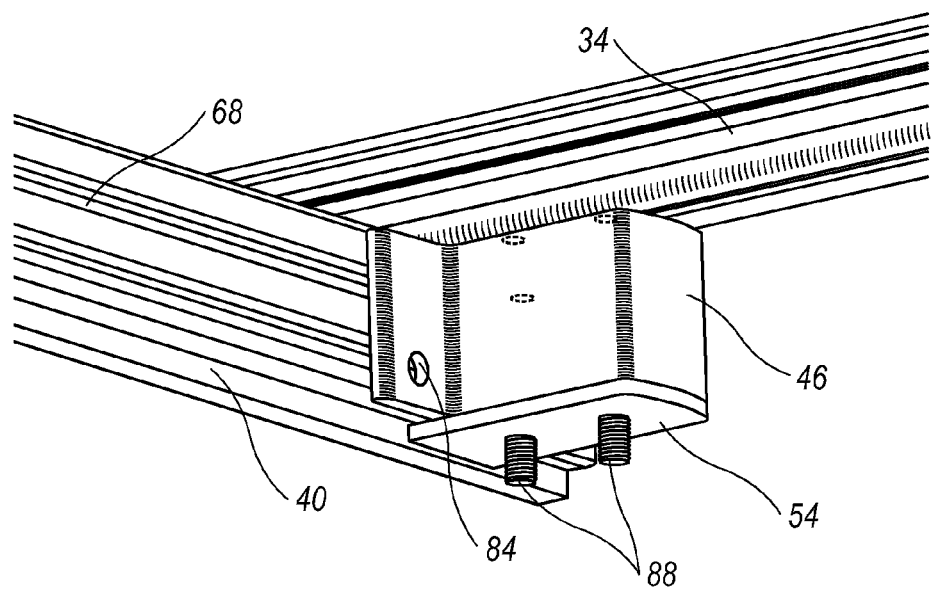
FIG. 9 provides a perspective view illustrating a lift block according to the present invention positioned with respect to a side rail and a load bar showing bolts projecting below the lift block for connection to an upright post mounted on the pickup truck.

FIG. 9 provides a perspective view illustrating a lift block 46 according to the present invention positioned with respect to a side rail 36 and a load bar 34 showing bolts 88 projecting below the lift block for connection to an upright post mounted on the pickup truck 100. The bolts 88 pass through the lift block 46 and the mounting plate 54 to be secured by nuts rotated up the threads of the bolts 88 until they firmly engage the lower surface of the mounting plate 54.

An elevated cargo carrier assembled using an over-cab extension kit and its components have been described herein. These and other variations, which will be appreciated by those skilled in the art, are within the intended scope of this invention as claimed below. As previously stated, detailed embodiments of the present invention are disclosed herein; however, it is to be understood that the disclosed embodiments are merely exemplary of the invention that may be embodied in various forms.

INDUSTRIAL APPLICABILITY

The present invention finds applicability in the construction and recreational industries.

What is claimed and desired to be secured by Letters Patent is as follows:

1. A cargo carrier kit for a truck, the kit comprising:
   a plurality of first rail sections for joining end to end using a number of first splice plates for connection therebetween to provide a first side rail including a forward end portion and a trailing end portion;
   a plurality of second rail sections for joining end to end using a number of second splice plates for connection therebetween to provide a second side rail having parallel alignment to the first side rail and having a separation therefrom, the second side rail including a front end portion and a rear end portion;
   a forward load bar, supportable on the first side rail and the second side rail to provide an over-cab connection therebetween;
   at least a first block, releasably mountable between the forward end portion and trailing end portion of the first side rail;

at least a second block, releasably mountable between the front end portion and rear end portion of the second side rail, the first and second blocks providing points of connection for opposing end portions of at least a first load bar to provide at least a first connection of the first side rail to the second side rail;

at least a third block, for releasable mounting at the trailing end portion of the first side rail;

at least a fourth block, for releasable mounting at the rear end portion of the second side rail, the third and fourth blocks providing points of connection for opposing end portions of the at least a second load bar to provide at least a second connection of the first side rail to the second side rail;

wherein, each connection between each of said first rail sections is provided by a different first splice plate for each connection therebetween and each connection between each of said second rail sections is provided by a different second splice plate for each connection therebetween;

each of said plurality of first rail sections and each of said plurality of second rail sections comprise an inner cavity for receiving said first splice plates and second splice plates;

said cavity of each of said plurality of first rail sections and each of said plurality of second rail sections comprising:
a curved arcuate wall; and
a stepped wall formed to include a recess bounded by a first indentation opposite a second indentation, said stepped wall connected with said curved arcuate wall.

2. The cargo carrier kit for a truck as claimed in claim 1 wherein said recess and first and second indentations, extend the length of said first side rail and said second side rail producing a pair of inner channels and a pair of grooves.

3. The cargo carrier kit for a truck as claimed in claim 1 further comprising upright posts extending from said truck and connected with said first and second load bars, and each of said first, second, third and fourth block being aligned with said upright posts.

4. The cargo carrier kit for a truck as claimed in claim 3 wherein said upright posts comprise plates for mounting said first, second, third and fourth thereon.

5. A truck cargo carrier comprising:
a first side rail including a forward end portion, a trailing end portion and a plurality of first rail sections joined end to end using a number of first splice plates;
a second side rail having parallel alignment to the first side rail and having a separation therefrom, the second side rail including a front end portion, a rear end portion and a plurality of second rail sections joined end to end using a number of second splice plates;
at least a first load bar, supported over the first side rail mid-way between the forward end portion and the trailing end portion, the at least first load bar supported over the second side rail mid-way between the front end portion and the rear end portion to provide at least a first connection between the first side rail and the second side rail;
at least a second load bar spaced apart from the first load bar, the second load bar supported over the first side rail adjacent to the trailing end portion, the at least a second load bar supported over the second side rail adjacent to the rear end portion to provide at least a second connection between the first side rail and the second side rail;
a forward load bar supported over the first side rail adjacent to the forward end portion, the forward load bar supported over the second side rail adjacent to the front end portion to provide an over-cab connection between the first side rail and the second side rail;

wherein, each connection between each of said first rail sections is provided by a different first splice plate for each connection therebetween and each connection between each of said second rail sections is provided by a different second splice plate for each connection therebetween;

each of said plurality of first rail sections and each of said plurality of second rail sections comprise an inner cavity for receiving said first splice plates and second splice plates;

said cavity of each of said plurality of first rail sections and each of said plurality of second rail sections comprising:
a curved arcuate wall; and
a stepped wall formed to include a recess bounded by a first indentation opposite a second indentation, said stepped wall connected with said curved arcuate wall.

6. The cargo carrier kit for a truck as claimed in claim 5, wherein said recess and first and second indentations, extend the length of said first side rail and said second side rail producing a pair of inner channels and a pair of grooves.

* * * * *